United States Patent Office 3,698,953
Patented Oct. 17, 1972

3,698,953
GALVANIC CELL
Morris Eisenberg, Palo Alto, Calif., assignor to Elca Battery Company, Sunnyvale, Calif.
No Drawing. Original application Apr. 22, 1970, Ser. No. 31,021. Divided and this application May 27, 1971, Ser. No. 147,598
Int. Cl. H01m 35/02
U.S. Cl. 136—20
13 Claims

ABSTRACT OF THE DISCLOSURE

A galvanic cell is disclosed having a cathode comprising a mercury compound to provide active cathodic electrochemical action during cell operation and conductive powders mixed with the mercury compound to provide mass electrical conductivity through the cathode during cathodic electrochemical action. The conductive powders are coated with mercury in constructing the cathode in order that mercury in liquid form reduced from the mercury compound during cell operation rapidly and uniformly wets the mercury coated powders rather than agglomerate and thereby form means which could internally short-circuit the cell or contaminate the cell anode.

BACKGROUND OF THE INVENTION

This is a division of application Ser. No. 31,021, filed Apr. 22, 1970, now Pat. No. 3,630,779.

This invention relates to galvanic cells of the type which employ cathodes comprising mercury compounds as an electrochemically active material.

Galvanic cells have heretofore employed cathodes comprising compounds of mercury such as mercury oxides, mercury sulfides and mercury halides as an electrochemically active material. As such compounds have relatively poor electrical conductivity metallic powders have been mixed with the mercury compound material to provide improved mass electrical conductivity through the body of the cathode. Conventionally, graphite powders of various types are employed to achieve this mass conductivity. However, since graphite is not readily wetted by mercury the liquid mercury formed by the reduction of the mercury compound during cell operation tends to agglomerate and thereby form into relatively large globules. These globules of mercury are then free to move through the cell and eventually cause short-circuiting and thus premature failure of the cell. To avoid this problem in those particular applications where the criticality of premature shorting would present very series extraneous consequences, or where cell discharge it at a relatively low rate proceeding over a long period of time, silver powders or even gold have been used in lieu of graphite. As these powders are generally wetted by mercury the aforementioned problem of agglomeration of mercury is avoided by the use of these metallic powders. However, this approach requires a relatively large proportion of silver or gold powder to the mercury compound to provide for sufficient retention of the liquid mercury in an unagglomerated form. This is due to the fact that the rate of silver and gold particles by mercury is relatively slow and the surface wetting of the particles is incomplete. This requirement for large quantities of silver or gold has resulted in an apparent necessity for exceedingly expensive cathodes for such specialized applications.

Accordingly, it is an object of the present invention to provide improved galvanic cells of the types which employ cathodes comprising mercury compounds as an active electrochemical constituent.

More particularly, it is an object of the present invention to provide a galvanic cell having a cathode comprising a mercury compound mixed with conductive powders which are readily wetted by mercury reduced from the mercury compound during cell operation.

Another object of the invention is to provide a galvanic cell having a cathode comprising a mercury compound mixed with a relatively inexpensive quantity of conductive powders which are wettable by mercury reduced from the mercury compound during cell operation.

SUMMARY OF THE INVENTION

Briefly described, the present invention is a galvanic cell having a cathode comprising a mercury compound to provide active electrochemical action during cell operation. The cathode also comprises electrically conductive powders mixed with the mercury compound to provide mass electrical conductivity through the cathode during the cathodic electrochemical action. In constructing the cathode the conductive powders are coated with mercury whereby mercury in liquid form reduced from the mercury compound during cell operation readily wets the mercury coated powders and thereby tends not to agglomerate and short circuit the cell.

DESCRIPTION OF EXEMPLARY EMBODIMENTS

The just summarized mercury oxide cathodes may be used in different types of cells. They can be used, for instance, in mercury-zinc cells having an alkaline electrolyte of sodium hydroxide or potassium hydroxide or mixtures thereof. They also can be used in mercury-cadmium cells with similar alkaline electrolytes, or in cells with neutral electrolytes, for instance, in cells with magnesium anodes in which magnesium perchlorate solutions in water or lithium perchlorate solutions in water are used as electrolytes. Where desired, mercury sulfide compounds or mercury halide compounds may be substituted for mercury oxide and used with aprotic solvent non-aqueous electrolytes such as propylene carbonate solutions of lithium chloroaluminate. The anode in such a cell can comprise lithium or other alkali or earth alkali metals.

Where, in accordance with the principles of this invention, a metal powder generally wettaable by mercury, such as silver, gold or copper, is pretreated in a separate step with mercury salts to result in a preamalgamation of its surface with a very small amount of mercury, then its rate of wetting by the mercury reduced from the cathodic discharge in the cell is much enhanced. Furthermore, this wetting by mercury is much more complete with the result that only a relatively small quantity of such preamalgamated metal powder is required to prevent mass agglomeration of mercury during cathode discharge. In addition, by presilverizing or pregoldizing conductive powders whcih normally do not amalgamate, such as graphite and carbon powders, it is possible to preamalgamate them subsequently and make them very effective for retention of mercury without subsequent globule agglomeration.

Example 1

1700 grams of graphite powder or 2500 grams of −325 mesh copper powder are made into a paste with a one liter solution of 300 grams of Rochelle Salt. Vigorous mixing or stirring should be used to make a uniform paste. Prepare a second solution of 300 grams of silver nitrate ($AgNO_3$) in five liters of water to which sufficient ammonia is added until the precipitate which initially forms just clears up, then add enough water to dilute this silver nitrate-ammonia solution to ten liters. This solution is then added, using a separatory funnel or other slow metering device, to the graphite or copper powder paste while vigorously agitating the paste. The addition should be slow and should be done over a period of 10–15 minutes, after which stirring is continued for 15 minutes. Filter the silverized powder on a suction funnel, wash with deionized water, and dry in an oven at 110° C. breaking up the lumps periodically. Force the powder through a 30 or 40 mesh screen. The silverized copper or graphite powder should be stored in a dry condition until time to mix it with the selected mercury compound. Just prior to forming the cathode mix the silverized powder is amalgamated with mercury by any one of many procedures well known in the art. The silverized powders, whose surfaces are uniformly and completely coated with mercury, are then homogeneously mixed with mercury oxide at a ratio of 1:10, by weight, and formed by conventional techniques such as that hereinafter described, into structural cathodes.

Example 2

One liter solution containing 3% of mercuric chloride ($HgCl_2$) by weight is first prepared. Stir the solution in a plastic container vigorously while slowly putting in through a powder funnel 1500 gm. of silver powder. Vigorous mechanical agitation to prevent sedimentation is important. After 3 to 5 minutes filter the suspension on a Buchner funnel. The powder is subsequently washed with deionized water for about one hour to remove all chloride ions. A sample of the filtrate may be tested with 0.1 normal silver nitrate solution for chloride ions. The silver nitrate solution should remain clear; if precipitation occurs the rinsing of the electrodes is continued. The washed powder is then dried at temperatures below 100° C. in a pan either in a vacuum or in a forced convection oven. The dry powder is finally added to a mercuric oxide cathode mix at a ratio of 1:8, by weight.

Example 3

1000 grams of dry silverized nickel powder is suspended with a vigorous stirrer in four liters of deionized water to which 10 cc. of a wetting agent, such as Triton X–100, is added. Separately, prepare a solution of 130 cc. concentrated nitric acid in three liters of water and add to it, while stirring, 45 grams of mercuric nitrate, $Hg(NO_3)_2$. This second solution is then added slowly through a separatory funnel or other metering means to the suspension of the silverized nickel powder over a period of 20–30 minutes. The stirring is continued for 10 minutes afterwards. Following suction filtration the cake is dried in an oven at 50° C. and the material, if necessary, forced through a 30 mesh screen. The amalgamated powder is then mixed with a dry blend of mercuric oxide with the conductive powder containing 15% of the preamalgamated powders, by weight.

One technique for forming the described examples of mixes into structural cathodes comprises pressing the mix into a metal can which constitutes the electrical connection to the cathode material. Alternatively, the mix may be pressed to a support screen to produce a flat plate to which contact is made by a welded tab. Where desired, the mix may also be prepared by a wet process in which an organic binder is added, dissolved in water or a suitable organic solvent. Such a wet slurry is then mixed or ball milled, finally dried and granulated to produce a dry pressing powder.

Other amalgamated powders may be substituted for those in the described examples. These, the surfaces of which are all amalgamated, include silver-coated nickel, silver-coated stainless steel, silver-coated Monel, silver-coated manganese, silver-coated carbon, and gold.

It should, of course, be understood that the just described examples merely illustrate principles of the invention, and that the spirit and scope of the invention is limited only by the following claims.

I claim:
1. In a galvanic cell having a cathode comprising a mercury compound to provide active cathodic electrochemical action during cell operation and conductive powders mixed with said mercury compound to provide mass electrical conductivity through said cathode during said cathodic electrochemical action, the improvement comprising in constructing said cathode said conductive powders being coated with mercury whereby mercury in liquid form reduced from said mercury compound during subsequent cell operation wets said mercury coated powders and thereby tends not to agglomerate and short-circuit the cell.

2. The apparatus of claim 1 wherein said conductive powders are substantially uniformly coated with said mercury coating.

3. The apparatus of claim 1 wherein the surfaces of said conductive powders are completely coated with said mercury coating.

4. The apparatus of claim 1 wherein the mix of mercury compounds and mercury coated conductive powders is substantially homogenous.

5. The apparatus of claim 1 wherein said conductive powders comprise a metal selected from the group consisting of silver, gold and copper.

6. The apparatus of claim 1 wherein said conductive powders are selected from the group consisting of silver-coated nickel, silver-coated stainless steel, silver-coated Monel, silver-coated manganese and silver-coated copper.

7. The apparatus of claim 1 wherein said conductive powders are selected from the group consisting of silver-coated carbon and silver-coated graphite.

8. The apparatus of claim 1 wherein said mercury compound is selected from the group consisting of mercury oxides, mercury sulfides and mercury halides.

9. In a galvanic cell having a cathode comprising a mercury compound to provide active cathodic electrochemical action during cell operation and conductive powders mixed with said mercury compound to provide mass electrical conductivity through said cathode during said cathodic electrochemical action, the improvement comprising said conductive powders having non-metallic core material coated with a metallic coating and said metallic coating coated with mercury.

10. The apparatus of claim 9 wherein said non-metallic core material comprises carbon.

11. The apparatus of claim 10 wherein said metallic coating includes a metal selected from the group consisting of silver and gold.

12. The apparatus of claim 9 wherein said non-metallic core material comprises carbon.

13. The apparatus of claim 12 wherein said metallic coating includes a metal selected from the group consisting of silver and gold.

References Cited

UNITED STATES PATENTS

| | | | |
|---|---|---|---|
| 2,554,504 | 5/1951 | Ruben | 136—7 |
| 2,772,321 | 11/1956 | Ensign | 136—120 R |
| 2,829,189 | 4/1958 | Coleman et al. | 136—107 |

ANTHONY SKAPARS, Primary Examiner

U.S. Cl. X.R.

136—107